United States Patent
DePaso et al.

(10) Patent No.: US 7,942,257 B2
(45) Date of Patent: May 17, 2011

(54) ROLLER-BELT CONVEYOR WITH INFEED PULL-AWAY

(75) Inventors: Joseph M. DePaso, River Ridge, LA (US); Timothy C. UnKauf, Bowersville, GA (US)

(73) Assignee: Laitram, L.L.C., Haraham, LA (US)

( * ) Notice: Subject to any disclaimer, the term of this patent is extended or adjusted under 35 U.S.C. 154(b) by 1093 days.

(21) Appl. No.: 11/426,409

(22) Filed: Jun. 26, 2006

(65) Prior Publication Data

US 2007/0295582 A1 Dec. 27, 2007

(51) Int. Cl.
*B65G 21/20* (2006.01)
(52) U.S. Cl. .................... 198/779; 198/837; 198/833
(58) Field of Classification Search ............. 198/779, 198/837, 833, 457.02, 370.09
See application file for complete search history.

(56) References Cited

U.S. PATENT DOCUMENTS

| | | | |
|---|---|---|---|
| 4,262,794 A | 4/1981 | Bourgeois | |
| 4,271,960 A | 6/1981 | Chalich | |
| 5,224,583 A | 7/1993 | Palmaer et al. | |
| 5,238,099 A | 8/1993 | Schroeder et al. | |
| 6,073,747 A | 6/2000 | Taquino et al. | |
| 6,318,544 B1 | 11/2001 | O'Connor et al. | |
| 6,484,871 B2 * | 11/2002 | van Leeuwen | 198/831 |
| 6,494,312 B2 | 12/2002 | Costanzo | |
| 6,758,323 B2 * | 7/2004 | Costanzo | 198/457.02 |
| 6,932,211 B2 | 8/2005 | Wieting et al. | |
| 6,968,941 B2 | 11/2005 | Fourney | |
| 6,997,306 B2 | 2/2006 | Sofranec et al. | |
| 7,021,454 B2 | 4/2006 | Ozaki et al. | |
| 7,040,480 B2 * | 5/2006 | Sedlacek | 198/457.02 |
| 7,111,722 B2 | 9/2006 | Burch | |

OTHER PUBLICATIONS

European Patent Office, "Search Report of PCT/US07/70730," Oct. 29, 2007, European Patent Office, Rijswijk, the Netherlands.

\* cited by examiner

*Primary Examiner* — Gene Crawford
*Assistant Examiner* — Kavel Singh
(74) *Attorney, Agent, or Firm* — James T. Cronvich

(57) ABSTRACT

A separation conveyor using a roller belt whose rollers are already rotating before receiving an article to provide immediate pull-away from an infeed conveyor. The rollers of a roller belt extend through the thickness of the belt and into contact with a bearing surface in a reversing segment of a belt path between the returnway and the carryway of the separation conveyor. The rollers are already rotating on the bearing surface in the reversing segment at the infeed end before they contact articles to avoid delays in pulling articles away from the infeed conveyor and onto the separation conveyor.

11 Claims, 3 Drawing Sheets

ROLLER-BELT CONVEYOR WITH INFEED PULL-AWAY

BACKGROUND

The invention relates generally to power-driven conveyors and, more particularly, to conveyors with roller belts having rotatable article-supporting rollers that roll on a bearing surface at the infeed end of the conveyor as the belt advances.

Roller belts are used in material-handling conveyors to increase the separation of conveyed articles by accelerating the articles along the conveying surface at a speed greater than the speed of the belt itself. Roller belts are typically characterized by a plurality of freely rotatable embedded rollers whose diameters exceed the thickness of the belt. In this way, salient portions of the rollers extend past the top and bottom surfaces of the belt, as shown in FIG. 7. The rollers 10 of the belt 12 ride on a bearing surface 14 under the carryway portion of the belt's path. As the belt advances in a direction of belt travel 16, the rollers are rotated in the direction of arrows 18 by their contact with the stationary bearing surface. The rotation of the rollers propels articles atop the rollers in the direction of belt travel, but at a higher speed—typically twice the belt speed if the rollers do not slip on the bearing surface. Because of the conventional positioning of idle sprockets 20 at the infeed end of the roller-belt conveyor, the bearing surface, to avoid interference, extends upstream to a position 22 downstream of the sprockets, which engage the belt between rollers. Until the rollers making their way around the sprockets reach the bearing surface, they do not rotate. Because the rollers 10' immediately at the infeed end of the roller-belt conveyor are not rotating, there is a delay before articles transferred onto the conveyor are accelerated on the belt and separated from trailing articles.

SUMMARY

This shortcoming is overcome by a conveyor embodying features of the invention. In one aspect, the conveyor comprises a roller belt having a plurality of rollers extending through the thickness of the roller belt. The roller belt advances along a conveying path that includes: (a) an upper carryway segment along which articles are conveyed in a conveying direction; (b) a lower returnway segment below the carryway segment along which the roller belt advances in a direction opposite to the conveying direction; (c) a first reversing segment along which the roller belt transitions upward from the returnway segment to the carryway segment; and (d) a second reversing segment along which the roller belt transitions downward from the carryway segment to the returnway segment. A stationary bearing surface underlies the roller belt in the first reversing segment and provides a surface on which the rollers roll in the first reversing segment as the roller belt advances.

In another aspect, a conveyor comprises a reversing wheel defining an exit end of the conveyor and a stationary convex bearing surface defining an infeed end of the conveyor. A belt arranged in a loop is trained around the reversing wheel and the bearing surface. A carryway segment of the belt loop extends from the infeed end to the exit end of the conveyor. The belt includes a plurality of rollers that extend through the thickness of the belt. The rollers roll on the bearing surface as the belt advances along the carryway from the infeed end to the exit end in a conveying direction.

In yet another aspect of the invention, a conveyor comprises a conveyor belt having rollers extending through the thickness of the conveyor belt. The conveyor belt advances in a conveying direction from an upstream end to a downstream end of a carryway segment of a conveying path. A bearing surface has a planar portion supporting the conveyor belt on the carryway segment and a stationary convex portion having a first end generally continuous with the planar portion at the upstream end and a second end below the plane of the planar portion. Tension in the advancing conveyor belt conforms the conveyor belt to the convex portion of the bearing surface and causes the rollers to rotate by contact with the convex portion so that the rollers are already rotating as they approach the carryway portion of the bearing surface at the upstream end of the conveyor.

BRIEF DESCRIPTION OF THE DRAWINGS

These features and aspects of the invention are better understood by reference to the following description, appended claims, and accompanying drawings, in which:

DETAILED DESCRIPTION

Figure 1:
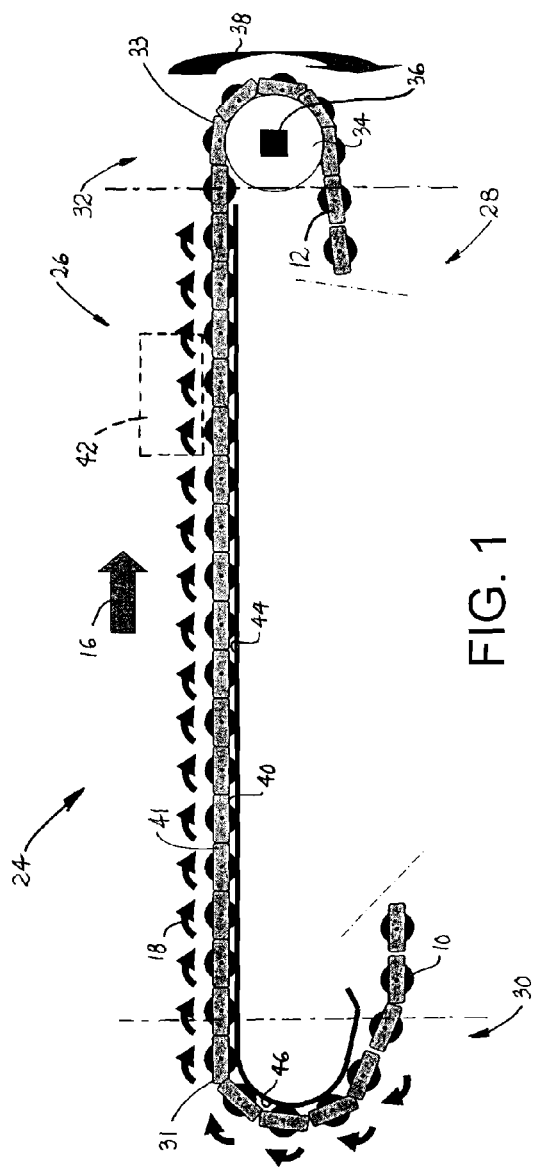
FIG. 1 is a side elevation view of a portion of a roller-belt conveyor embodying features of the invention, including a bearing surface in a reversing portion of the conveying path.
Figure 7:
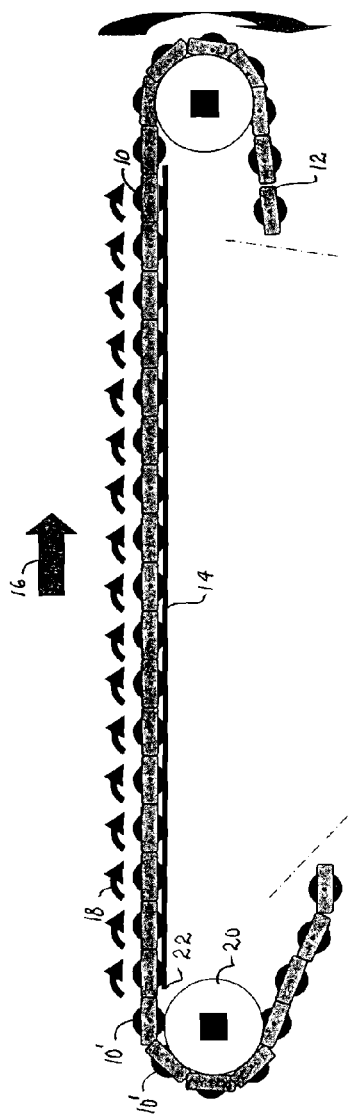
FIG. 7 is a prior art roller-belt riding atop a conventional bearing surface in a separation conveyor.

One version of a roller-belt conveyor embodying features of the invention is shown in FIG. 1. The conveyor 24 transports articles on a roller belt 12, which forms an endless belt loop defining a belt path. The belt path can be considered to be divided into four segments: (a) an upper carryway segment 26 along which articles are conveyed in a conveying direction 16; (b) a lower returnway segment 28 (shown in part) below the carryway segment; (c) a first reversing segment 30 at an upstream, or infeed, end 31 of the conveyor along which the roller belt transitions upward from the returnway to the carryway; and (d) a second reversing segment 32 at a downstream, or exit, end 33 of the conveyor along which the roller belt transitions downward from the carryway to the returnway. A reversing wheel 34, which may be a drive drum or a drive sprocket mounted on a shaft 36 and driven by a motor (not shown) to rotate in the direction of the arrow 38, engages the underside of the belt loop in the second reversing segment to drive the belt and transition it to the returnway. Alternatively, the roller belt may be driven in the returnway segment by a drum or sprocket. In that case, the reversing wheel at the exit end of the conveyor is an idle wheel with its shaft not coupled directly to a drive motor.

The roller belt 12 includes a plurality of rollers 10 having salient portions that protrude past inner 40 and outer 41 sides of the belt. Articles 42 are supported atop the salient portions of the rollers extending above the outer side of the belt along the carryway. The salient portions of the rollers extending past the inner side of the belt on the carryway ride along a planar carryway bearing surface 44. As the belt advances, the rollers roll on the bearing surface and rotate in the direction of the arrows 18. The rotation of the rollers propels articles in the direction of belt travel at twice the speed of the belt if the rollers don't slip as they roll along the bearing surface. In this way, the conveyor increases the spacing between consecutive conveyed articles.

At the downstream, or exit, end 33 of the conveyor, the planar bearing surface 44 terminates upstream of the reversing wheel to avoid interference. There is no reversing wheel at the upstream end 31 of the conveyor in this version. Instead, the roller belt reverses around a stationary convex bearing surface 46 in the first reversing segment. In this version, the convex bearing surface is continuous with the planar bearing surface 44. Tension in the advancing roller belt conforms the belt to the convex bearing surface as the belt is pulled through the first reversing segment at the upstream end of the conveyor. By providing a bearing surface for the rollers in the first reversing segment, the convex bearing surface allows the rollers to rotate before they reach the carryway. Because all the rollers at the upstream end of the conveyor are rotating at full speed before they enter the carryway, articles fed onto the conveyor at the upstream end are immediately pulled away by the rotating rollers. There is no delay due to non-rotating rollers at the infeed to the conveyor.

Figure 2:
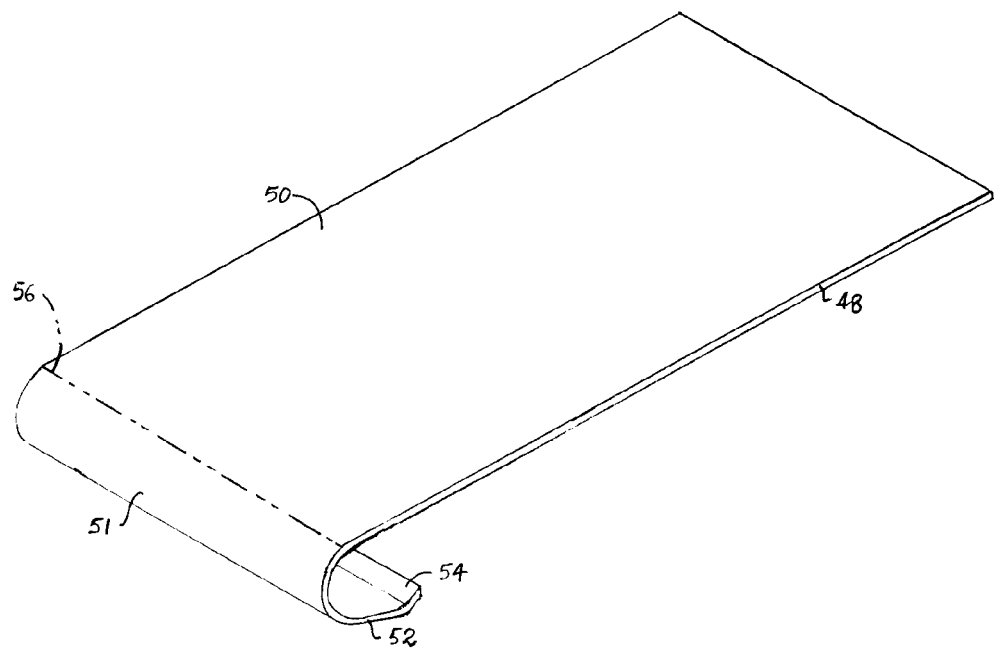
FIG. 2 is an isometric view of a conveyor pan providing a bearing surface usable in the conveyor of FIG. 1.

One version of the bearing surfaces of FIG. 1 is shown in FIG. 2. The bearing surfaces are formed on a sheet 48 that includes a planar portion 50 and a convex portion 51. The sheet is continuous across the width of the conveyor in the carryway segment and in the first reversing segment. When viewed from the side edge 52 of the sheet, the convex portion is C-shaped with a slightly upturned lip 54 at its lower end to prevent the belt from snagging as it first encounters the convex bearing surface. The sheet may be made of metal, which may be coated with a synthetic material to enhance the rolling engagement of the rollers on the bearing surface, or of a synthetic material with desirable rolling properties. The sheet may be a single bent sheet forming one continuous bearing surface or may be made of two sections (the planar portion and the convex portion) separated by a small gap at the interface 56 between the two portions.

Figure 3:
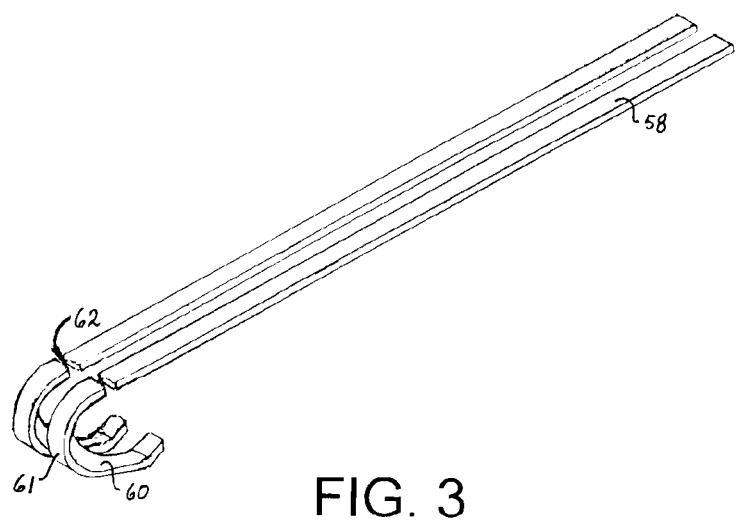
FIG. 3 is an isometric view of two wearstrips providing a portion of a bearing surface usable in the conveyor of FIG. 1.

FIG. 3 shows an alternative embodiment of the bearing surface. In this version, the bearing surfaces are segmented across the width of the conveyor. Parallel linear wearstrips 58 provide planar bearing surfaces along the carryway. C-shaped wearstrips 60 provide convex outer bearing surfaces 61 in the first reversing segment. The linear and convex wearstrips are shown separated by a small gap 62 at the interface between the first reversing segment and the carryway segment. Of course, a continuous wearstrip bent to form the convex portion at one end could be used instead.

Figure 4:
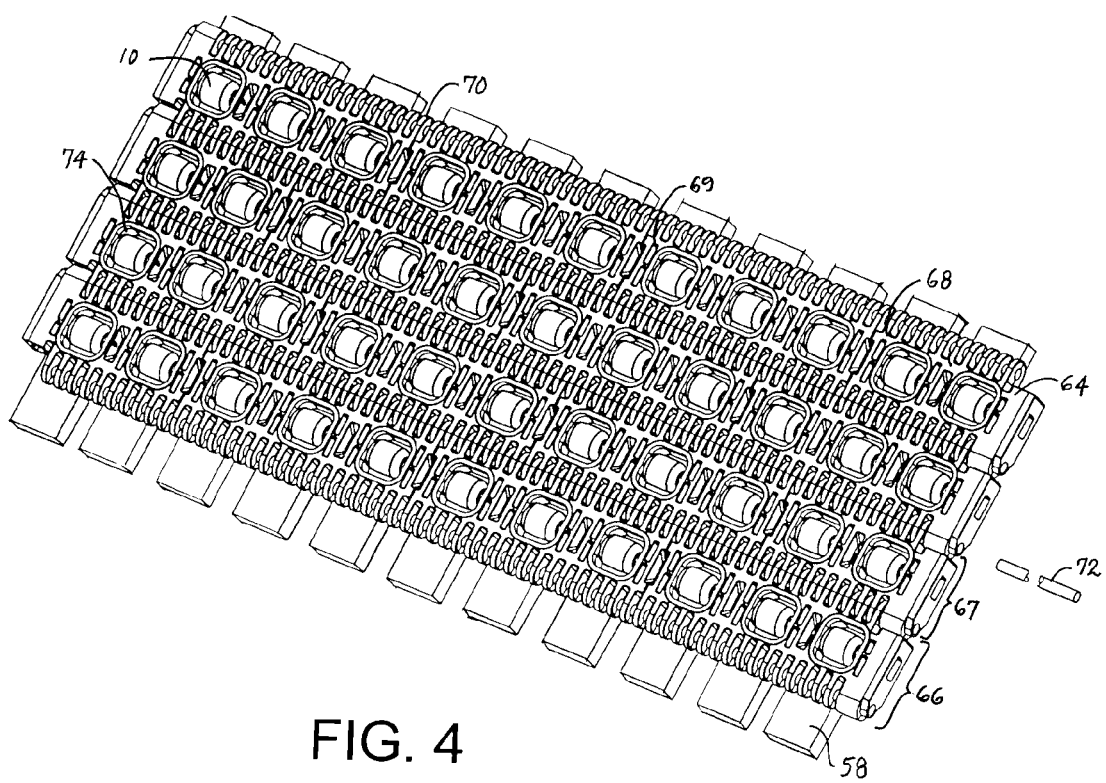
FIG. 4 is an axonometric view of a portion of a roller belt supported by wearstrips as in FIG. 3 in a conveyor as in FIG. 1.
Figure 5:
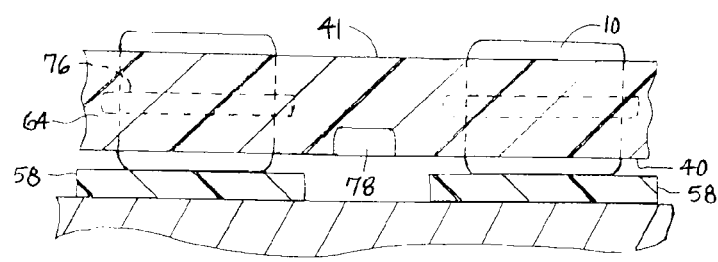
FIG. 5 is a cross section taken along lines 5-5 of FIG. 4.

Further details of a roller belt and the planar portion of the wearstrips of FIG. 3 along the carryway are shown in FIGS. 4 and 5. The portion of the roller belt shown is a modular plastic belt 64 constructed of rows 66, 67 of one or more belt modules, such as edge modules 68 and interior modules 69, arranged side by side to form a row. Hinge eyes 70 at the leading and trailing ends of each belt row are interleaved with corresponding hinge eyes of a consecutive row and connected together by a hinge rod 72 received in the lateral passageway formed by the aligned, interleaved hinge eyes. Rollers 10 are mounted in cavities 74 formed in the interior of the modules. The rollers are arranged in parallel lanes. The linear wearstrips 58 are also arranged in parallel on spacings equal to the spacings of the lanes of belt rollers to provide planar bearing surfaces underlying each longitudinal lane of rollers. Each roller has a diameter greater than the thickness of the belt so that salient portions of the rollers protrude past the inner 40 and outer 41 sides of the belt. The rollers in this version rotate on axles 76 spanning the cavities and supported at their ends in the interior of the belt modules. Bores in the cylindrical rollers receive the axles. In this example, the axles are arranged perpendicular to the direction of belt travel so that the rollers rotate in the direction of belt travel as the belt advances. Recesses 78 formed in the belt modules on the inner side of the belt loop include drive surfaces that are engaged by driving surfaces, such as teeth, on the reversing wheel.

Figure 6:
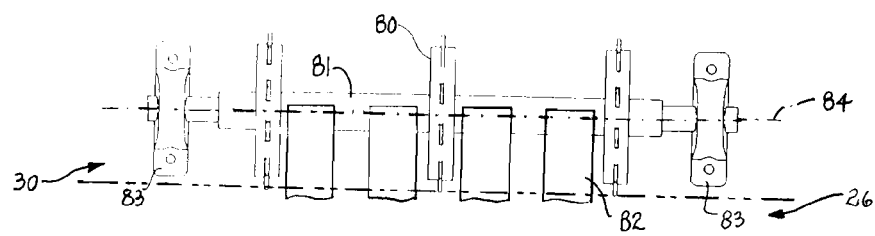
FIG. 6 is a top plan view of the infeed portion of another version of a roller-belt conveyor (with the belt removed to simplify the drawing) embodying features of the invention, including wearstrips extending from the carryway into the reversing portion at the infeed end of the conveyor.

In another version of the conveyor shown in FIG. 6, reversing wheels 80, or sprockets, mounted on a shaft 81 supported for rotation in bearing blocks 83, are used in the first reversing segment. Planar bearing surfaces 82 extend from the carryway segment 26 upstream into the first reversing segment 30 past the centerline 84 of the shaft. The extension of the linear bearing surface into the first reversing portion provides a bearing surface for the roller belt rollers to roll on at the upstream, infeed end of the conveyor. Consequently, articles fed onto the roller-belt conveyor immediately encounter rotating rollers.

Thus, the various versions of roller-belt conveyors described provide immediate pull-away of articles transferred to the infeed end of a separation conveyor.

Although the invention has been described in detail with respect to a few preferred versions, other versions are possible. For example, the roller axles in the conveyor belt need not be oriented perpendicular to the direction of belt travel. They could instead be oriented oblique to the direction of belt travel to provide an additional lateral component of motion to conveyed articles. As another example, spherical roller balls without axles, rather than the generally cylindrical rollers described, could be used as belt rollers. As still another example, the convex bearing surface could alternatively be realized as the outer surface of a stationary drum or shoe. So, as these few examples suggest, the scope of the claims is not meant to be limited to the versions described in detail.

What is claimed is:

1. A conveyor comprising:
    a roller belt having a plurality of rollers extending through the thickness of the roller belt advancing along a conveying path including an upper carryway segment along which articles are conveyed in a conveying direction, a lower returnway segment below the carryway segment along which the roller belt advances in a direction opposite to the conveying direction, a first reversing segment along which the roller belt transitions upward from the returnway segment to the carryway segment, and a second reversing segment along which the roller belt transitions downward from the carryway segment to the returnway segment; and
    a C-shaped stationary bearing surface underlying the roller belt in the first reversing segment and providing a surface on which the rollers roll in the first reversing segment as the roller belt advances.

2. A conveyor as in claim 1 wherein the C-shaped stationary bearing surface underlying the roller belt in the first reversing segment is a convex bearing surface.

3. A conveyor as in claim 1 comprising a bearing surface underlying the roller belt in the upper carryway segment that is continuous with the C-shaped stationary bearing surface underlying the roller belt in the first reversing segment.

4. A conveyor as in claim 3 wherein the bearing surfaces are continuous across the width of the conveyor.

5. A conveyor as in claim 3 wherein the bearing surfaces are segmented across the width of the conveyor.

6. A conveyor as in claim 1 comprising a reversing wheel engaging the roller belt in the second reversing segment and devoid of a reversing wheel in the first reversing segment.

7. A conveyor comprising:

a reversing wheel defining an exit end of the conveyor;

a stationary C-shaped convex bearing surface spaced apart from the reversing wheel and defining an infeed end of the conveyor;

a belt arranged in a loop trained around the reversing wheel and the stationary C-shaped convex bearing surface and defining a carryway segment extending from the infeed end to the exit end of the conveyor;

wherein the belt includes a plurality of rollers extending through the thickness of the belt to roll on the stationary C-shaped convex bearing surface as the belt advances along the carryway from the infeed end to the exit end in a conveying direction.

8. A conveyor as in claim 7 comprising a carryway bearing surface underlying the belt in the carryway segment that is continuous with the stationary C-shaped convex bearing surface.

9. A conveyor as in claim 8 wherein the carryway bearing surface and the stationary C-shaped convex bearing surface are continuous across the width of the conveyor.

10. A conveyor as in claim 8 wherein the carryway bearing surface and the stationary C-shaped convex bearing surface are segmented across the width of the conveyor.

11. A conveyor as in claim 7 devoid of a reversing wheel at the infeed end of the conveyor.

* * * * *